United States Patent [19]
Earle et al.

[11] 4,243,867
[45] Jan. 6, 1981

[54] APPARATUS FOR FUSIBLY BONDING A COATING MATERIAL TO A METAL ARTICLE

[75] Inventors: Michael Earle, Mapleton; Glenn H. Lenzen, Peoria, both of Ill.

[73] Assignee: Caterpillar Tractor Co., Peoria, Ill.

[21] Appl. No.: 919,349

[22] Filed: Jun. 26, 1978

Related U.S. Application Data

[60] Division of Ser. No. 543,191, Jan. 24, 1975, Pat. No. 4,117,302, which is a continuation-in-part of Ser. No. 447,971, Mar. 4, 1974, abandoned.

[51] Int. Cl.³ .................................................. B23K 27/00
[52] U.S. Cl. .......................... 219/121 LC; 29/156.7 A; 219/121 LE
[58] Field of Search ................. 29/156.7 A, 156.7 R; 75/65 EB; 219/121 L, 121 LM, 121 EB, 121 EM, 121 P, 76.1, 77

[56] References Cited

U.S. PATENT DOCUMENTS

| | | | |
|---|---|---|---|
| 3,147,747 | 9/1964 | Kittelson | 29/156.7 R X |
| 3,362,057 | 1/1968 | Kubera et al. | 29/156.7 |
| 3,417,223 | 12/1968 | Sleigerwald | 219/121 EM |

OTHER PUBLICATIONS

Alfred O. Schmidt, *Journal of Engineering for Industry*, "Tools and Engineering Materials with Hard, Wear-Resistant Infusions," pp. 549-552, 8, 1969.

*Primary Examiner*—C. L. Albritton
*Attorney, Agent, or Firm*—Charles E. Lanchantin, Jr.

[57] ABSTRACT

An apparatus for fusibly bonding a powder coating material to a metal article includes a holding device for releasably supporting the article, a depositing device for controllably placing the powder coating material in a band onto a surface of the article, and a laser beam for controllably liquifying a portion of the band of powder and juxtaposed surface while minimizing heat transmission into the article and allowing rapid hardening of the portion of the band after removal of the laser beam to provide a surface layer having properties based substantially solely on the coating material and a relatively thin, strong region of interstitial bond between the surface layer and the article having properties based upon both the coating material and the article. An exemplary engine valve with a relatively fine metallurgical surface structure for increased hardness is disclosed.

7 Claims, 6 Drawing Figures

FIG-6- PRIOR ART
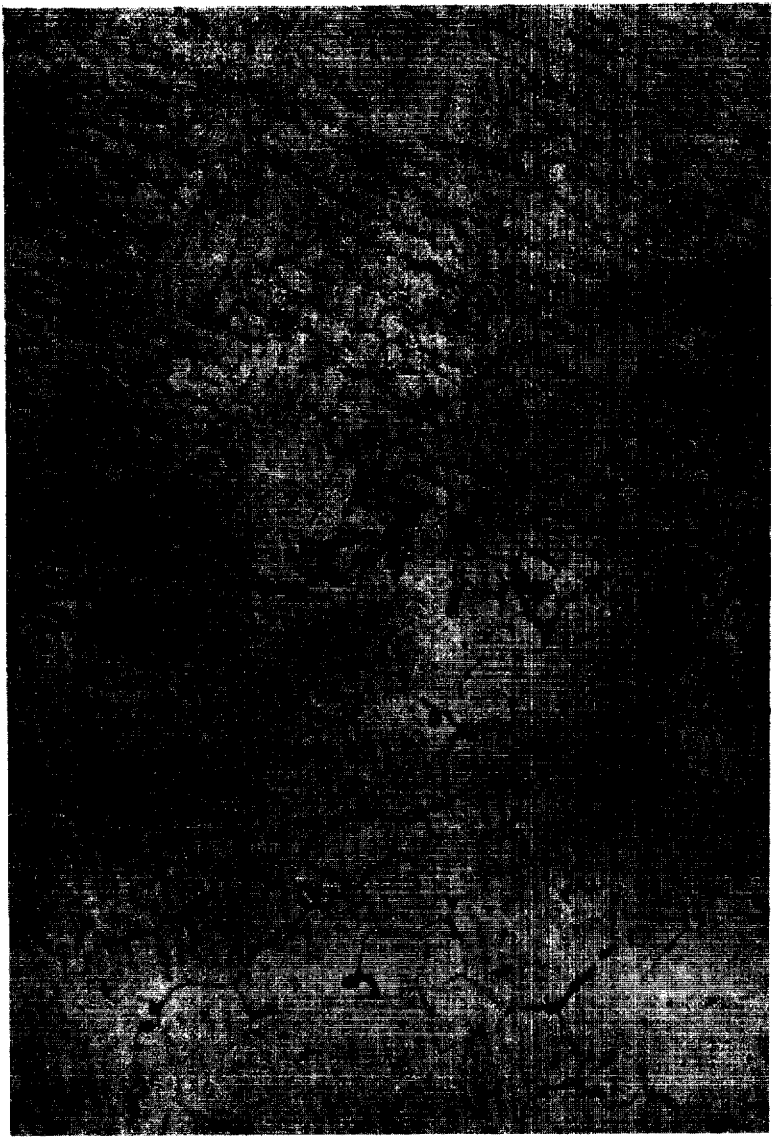
225X

APPARATUS FOR FUSIBLY BONDING A COATING MATERIAL TO A METAL ARTICLE

CROSS REFERENCE TO RELATED APPLICATIONS

This is a division of Ser. No. 543,191 filed Jan. 24, 1975, now U.S. Pat. No. 4,117,302, which is a continuation-in-part of Ser. No. 447,971 filed on Mar. 4, 1974, and now abandoned.

BACKGROUND OF THE INVENTION

Surface alloying of metals is usually accomplished by welding processes or various flame and plasma spraying techniques. Welding processes utilize an electrical or gaseous energy source with a highly variable power level which is difficult to control. As a result, excess heat is normally directed to the article being coated and the microstructure thereof is often adversely affected so that additional heat treatment is subsequently necessary. While the strength of the bond between the surface coating and article may be sufficient with such welding processes, an excessively thick coating is normally provided because of irregularities in the deposition rate and the lack of the full ability to control its placement. Such excess coating must, in many instances, be machined off to achieve the desired final surface contour at additional expense. Further, welding processes are basically accomplished at a rather slow material deposition rate and the accompanying control problems often lead to impurities in the microstructure, cracks or porosity, or other forms of harmful metallurgical defects which tend to decrease the strength of the coating and its bond to the article.

By way of example, engine valves of austenitic chrome nickel silicon steel with Stellite No. 6 coating material fusibly bonded thereto around the annular valve seat portion thereof have been widely adopted by the diesel engine industry. Such coating material is available from the Stellite Division of Cabot Corp., Kokomo, Indiana. These valves are produced by a relatively complex manufacturing process utilizing gaseous torches to extensively heat the valve head prior to, during, and subsequent to depositing the Stellite coating material thereon. This process is known as "puddle welding". The disadvantages of this expensive and relatively slow process include directing an excessive amount of heat into the base material and slow cooling of the coating. This results in a relatively thick overall diffusion zone or region of interstitial bond of approximately 0.020" between the base material and the coating as well as dendritic segregation and enlarged crystallization of the coating material with an accompanying decreased hardness thereof. Further, the thick diffusion zone represents a region having neither the desirable properties of the base material or of the coating. For example, it is known that the iron in the steel degrades the Stellite when present in only relatively minute amounts. Accordingly, the service life of these valves is not as high as desired.

On the other hand, flame and plasma spraying techniques apply a coating material to an article without substantial heating of the article, with the result that a relatively poor metallurgical bond occurs therebetween. Such a technique is usually limited to a coating thickness of a few thousandths of an inch having generally low strength. U.S. Pat. No. 3,310,423 issued Mar. 21, 1967 to H. S. Ingham, Jr. discloses a flame spraying process for applying a coating utilizing instantaneous energy bursts from a laser beam to raise the temperature of the previously heated flame sprayed particles as they are propelled toward the surface of an article. The substantially molten particles are purported to adhere to the surface of the article upon contact therewith with a better bond than conventional flame spraying processes, which are generally known to have a relatively weak bond between the coating and the article, and coating porosity. This method is more expensive because it requires dual heating and, further, the thickness of the applied layers is restricted to only a few thousandths of an inch. Because of these deficiencies, flame spraying processes have been considered entirely unsatisfactory for hard facing an engine valve, for example.

Other heating sources such as the possible use of solar energy or electron beam energy appear to raise more difficult problems. With solar energy, a large and expensive heat gathering system is needed in order to obtain sufficient power density energy levels and the broad spectrum energy source is continually changing. Likewise, with electron beam energy a relatively expensive evacuation system is normally necessary, and this greatly restricts the manufacturing process of the parts to be coated. For example, the vapor pressure of either the coating material or the article could be adversely affected and some materials might volatilize, imposing further limits on material choice which is already limited by the electron beam welding process itself.

Illustrative of the wide range of efforts to solve the particular problem of applying a hard surface coating to the head of an engine valve, for example, are U.S. Pat. No. 3,147,747 to LeRoy O. Kittelson; U.S. Pat. No. 3,362,057 to Gerhard Kubera et al; and U.S. Pat. No. 3,649,380 to Max J. Tauschek. Also, U.S. Pat. No. 3,478,441 to Alexander Goloff et al and assigned to the assignee of the present invention discloses a method of friction welding a facing material workpiece to an engine valve to provide an impact resistant seat thereto. However, none of these methods completely solves the various problems, including the frequent need to machine off the excess coating, or solves them in a sufficiently economical manner. One other method, U.S. Pat. No. 3,663,793 to James Petro et al, describes a way of applying a coating to a glass light bulb or the like for decorative purposes, using heat from a laser beam or an electron beam. However, such method employs an additional heating step and makes no mention of improving the wear and impact resistant service life of the coating and its bond with the parent article to which the present invention is particularly directed.

SUMMARY AND OBJECTS OF THE INVENTION

It is therefore an ojbect of the present invention to provide an improved apparatus for fusibly bonding a coating material to the surface of a metal article wherein a relatively high strength interstitial bond is obtained.

Another object of the present invention is to provide such an improved apparatus capable of applying a relatively uniform hard surface coating to an article of dissimilar material by thermal liquification of the material and adjacent portion of the article.

Another object of the present invention is to provide an apparatus for relatively quickly fusibly bonding a solid coating material placed against the surface of a metal article in order to minimize heat transfer into the entire article and to thereby accelerate the cooling thereof from its liquified state after the heat source is removed therefrom.

Another object of the present invention is to provide a metal article with an improved wear and impact resistant surface layer thereon, including a relatively fine crystalline structure of the surface layer and a relatively thin, but strong interstitial bond between it and the base material of the article.

Another object of the present invention is to provide an improved engine valve with a fusibly bonded annular valve seat thereon having a relatively fine crystalline structure for increased hardness and resistance to wear, and improved controllability of the metallurgical structure thereof.

Another object of the present invention is to provide an improved apparatus of the character described in which a relatively high energy continuous wave laser beam is precisely focused upon a relatively small area of the article being coated in order to minimize heat transmission to the entire article.

Other objects and advantages of the present invention will become more readily apparent upon reference to the accompanying drawings and the following description.

BRIEF DESCRIPTION OF THE DRAWINGS

FIG. 6 is a photomicrograph of a polished and etched portion of the conventionally puddle-welded engine valve at a magnification of approximately 225 times its true size for purposes of comparison with FIG. 2.

DESCRIPTION OF PREFERRED EMBODIMENT

Figure 1:
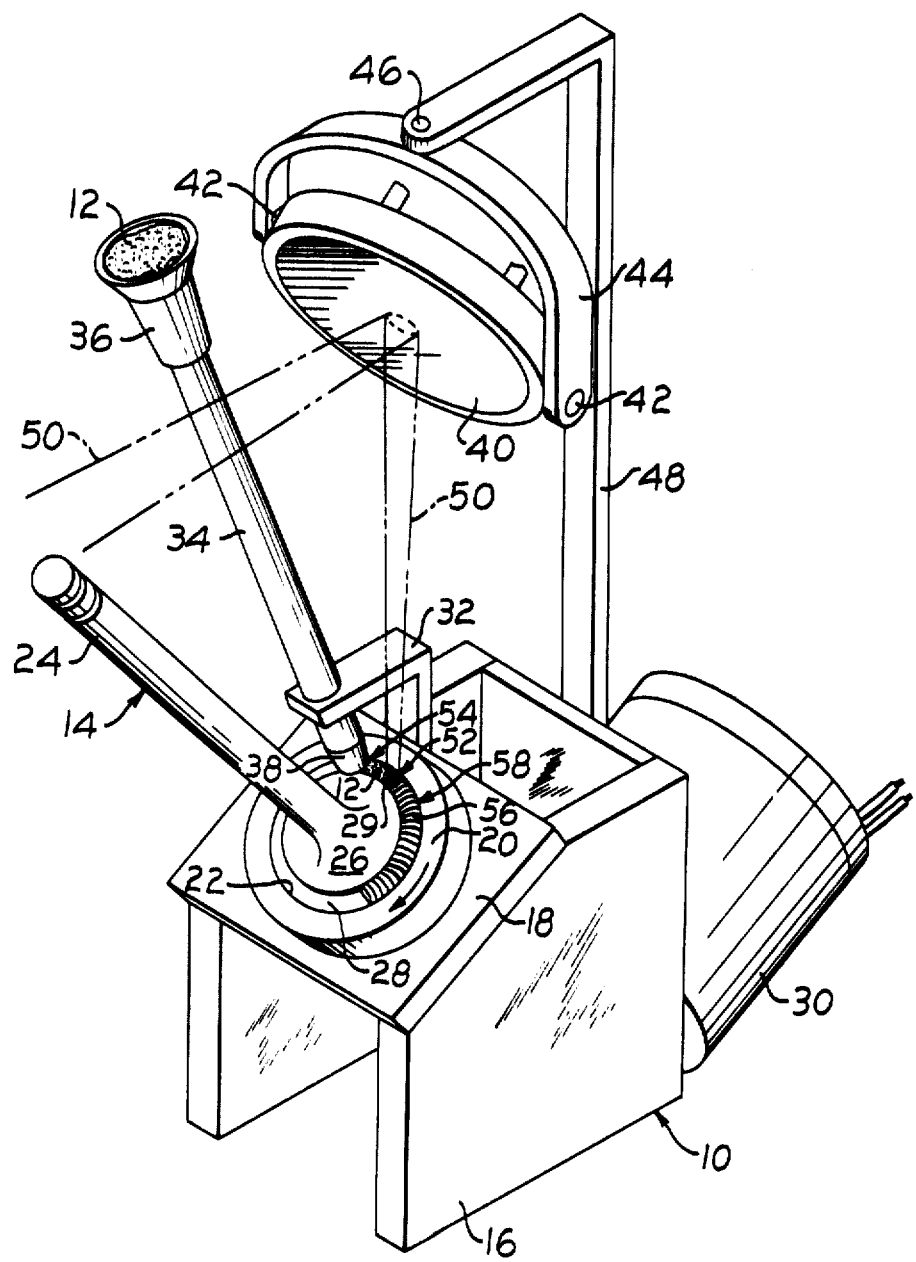
FIG. 1 is a perspective of an article holding fixture for fusibly bonding a coating material to a metal article in accordance with the novel method of the present invention.

FIG. 1 of the drawings shows an article holding fixture 10 for fusibly bonding a coating material of fusible powder 12 to the surface of a ferrous metal article 14 such as an engine valve or the like in accordance with the method of the present invention. In the instant embodiment, Stellite No. 6 powder is effectively bonded to the engine valve 14 of dissimilar material such as an austenitic chrome nickel silicon steel. The article holding fixture 10 which rotatably supports the engine valve includes a framelike base 16 which supports an obliquely upwardly facing mounting plate 18 on which is rotatably mounted an article holding disc 20 having a concentrically disposed cylindrical recess 22 formed therein.

The engine valve 14 includes an upwardly extending stem portion 24 and a lower head portion 26 adapted to be received in frictionally sliding relation within the cylindrical recess 22 in the rotatable holding disc 20. In this manner the engine valve is obliquely positioned at an approximate 45° angle to a horizontal plane by virtue of the relative disposition of the mounting plate 18 and the article holding disc 20. This beneficially results in an annular seat 28 on the head portion of the valve being maintained in substantially a horizontal plane at, and substantially adjacent, the uppermost portion or apogee of the rotating valve as shown generally by the reference numeral 29. A variable speed drive motor 30 is suitably attached to the base 16 of the holding fixture 10 in driving relation with the article holding disc 20 for rotation of the engine valve at a relatively fast predetermined speed, for example five (5) seconds per revolution.

An angled brace 32 is adjustably secured to the base 16 of the article holding fixture 10 of the present invention for holding a gravity fed powder delivery tube 34 in a generally upright manner above and inwardly adjacent to the periphery of the head portion 26 of the valve 14. The delivery tube has a funnel 36 at the upper end thereof adapted to conveniently receive the fusible powder 12, and a conical tapered lower end 38 disposed in predetermined relatively closely spaced relation to the annular seat 28 of the valve 14.

A water cooled, substantially flat reflective mirror 40 is universally adjustably supported substantially directly above the valve head 26 on a pair of horizontally aligned spaced pivot connections 42 of a depending yoke 44 and on a vertical pivot connection 46 intermediate the yoke and an upright arm 48 which is secured to the base 16. A fixed beam of relatively high power coherent electromagnetic energy 50, such as preferably a multi-kilowatt continuous wave laser beam, is substantially horizontally projected on the mirror 40 as shown in broken lines from a suitable source (not shown). The continuous wave laser beam 50 is then reflected downwardly by the mirror and focused on the annular seat 28 of the valve 14 to provide a relatively high energy heat interaction zone as indicated by the reference numeral 52. This heat interaction zone substantially coincides with the apogee 29 of the rotating valve.

Effective fusion of the powder 12 and the annular seat 28 at the interaction zone 52 is achieved using the laser beam 50 with a cross sectional beam pattern of substantially doughnut shape. Specifically, the preferred doughnut shaped laser beam pattern is 3/16 inch O.D. and 1/16 inch I.D., which results in a power density of $2.85 \times 10^5$ watts per square inch.

The powder delivery tube 34 is disposed arcuately offset from the apogee 29 of the valve 14 and closely above the annular seat 28 to provide a powder deposition zone generally indicated by the reference numeral 54. However, this powder deposition zone is relatively close to the apogee so that the annular seat 28 is substantially horizontally disposed and the fusible powder 12 is better retained thereon. Further, the conically tapered lower end portion 38 of the delivery tube 34 and its proximal location to the valve head portion 26 serves to meter the rate of delivery of the powder to the annular seat. For example, the powder fills up the space therebetween and no flow occurs as long as the valve remains stationary, yet flow occurs at the desired rate with a self-leveling action upon rotating the valve at the desired speed.

The article holding fixture 10 of the present invention, including the powder delivery tube 34, the reflective mirror 40, and laser beam 50 effectively produces a hard alloy layer on surface 56 on the engine valve 14. This surface becomes substantially solid at a solidification zone 58 which is also relatively close to the apogee 29 of the engine valve so that the melt of the powder 12 and adjacent portion of the valve which is liquified at the heat interaction zone 52 remains substantially horizontal and does not appreciably flow prior to such hardening.

It is extremely significant to note that by utilizing the manufacturing method of the present invention to apply the hard alloy layer 56 on the engine valve 14 the hardfacing portion of the cost can be reduced to approximately half that of conventional puddle welding techniques.

OPERATION

While the operation of the present invention is believed clearly apparent from the foregoing description, further amplification will subsequently be made in the following brief summary of such operation. The motor 30 and continuous wave laser beam 50 are simultaneously actuated to initiate the deposition of the powder 12 on the annular seat 28 of the engine valve 14 at the deposition zone 54, and to also impinge the extremely hot pattern of the laser beam thereon at the heat interaction zone 52. As the article holding disc 20 and engine valve are rotated by the motor in a clockwise direction as shown by the arrow in FIG. 1, the focused laser beam relatively rapidly thermally liquifies both the powder and adjacent portion of the valve head 26 at the interaction zone without excessive heating of the entire engine valve. The resulting melt thereafter travels beyond the heat of the laser beam at the interaction zone, and the rapid transfer of heat therefrom to the relatively cool mass of the engine valve, coupled with ambient air or room cooling thereof, quickly results in obtaining the hard alloy surface 56 at the solidification zone 58. This alloy surface is relatively thick, for example, 0.050" (1.27 mm), and has an extremely uniform cross section with an excellent interstitial bond. Such hard surface has been found so uniform in profile that only a minimum of final machining thereof is necessary to produce the completed engine valve.

Figure 2:
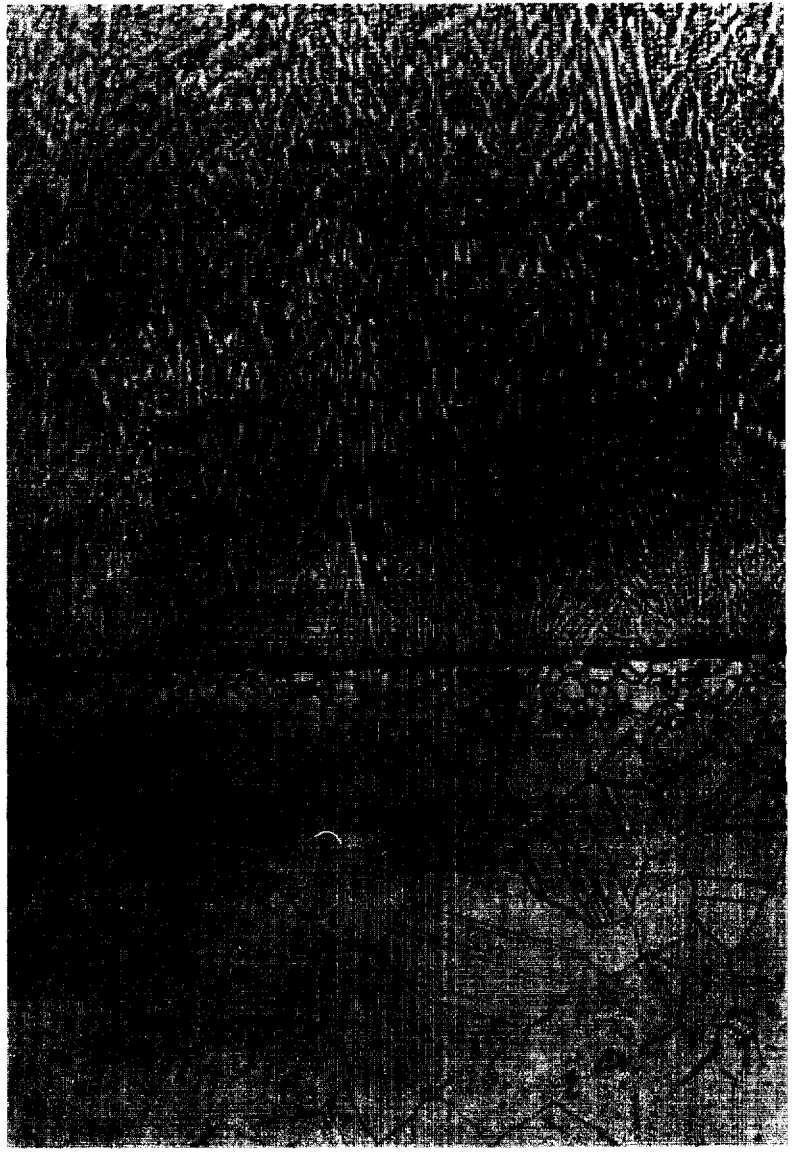
FIG. 2 is a photomicrograph of a polished and etched portion of an article and associated hardened coating produced by the method of the present invention at a magnification of approximately 225 times its true size.
Figure 3:
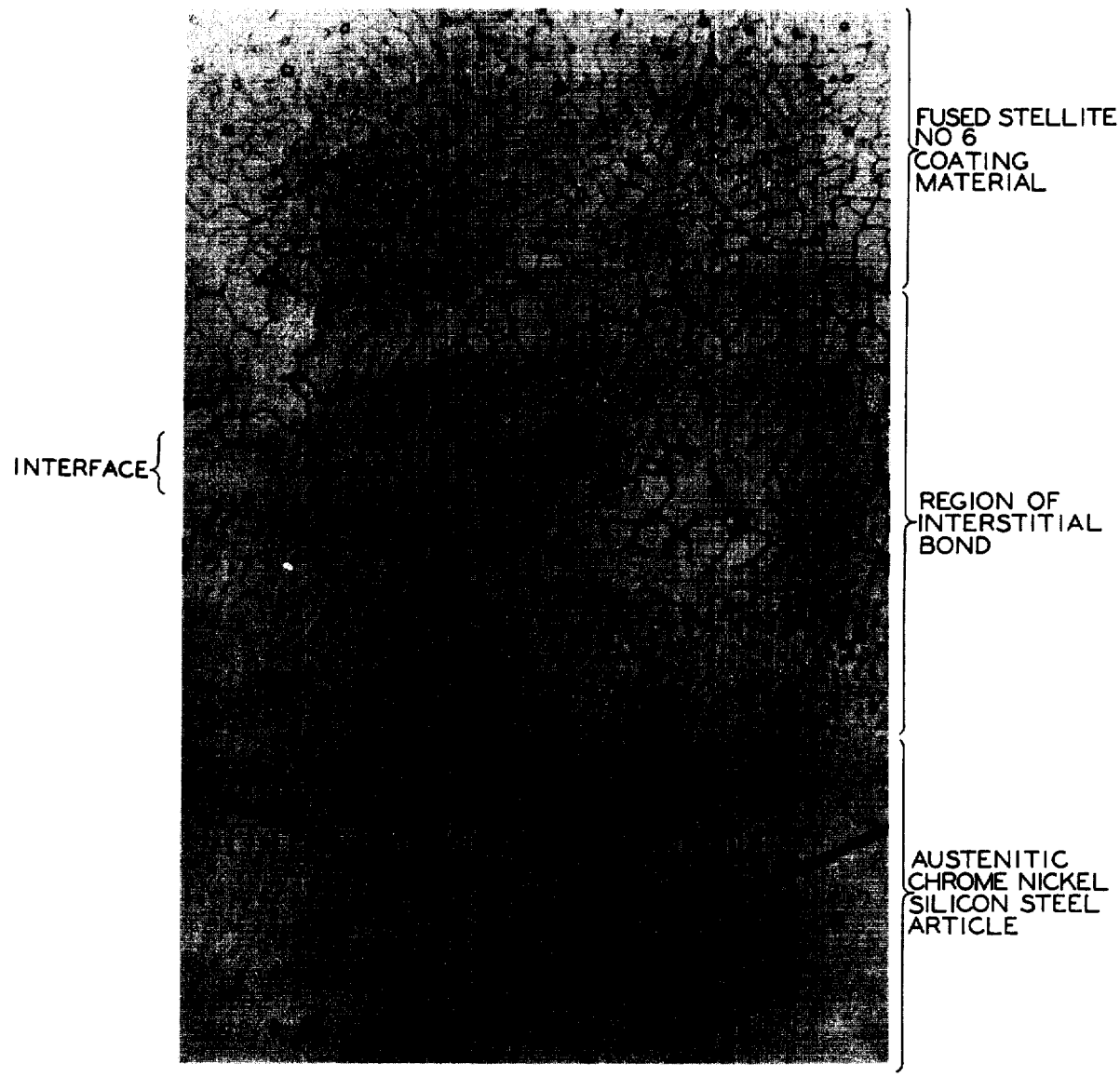
FIG. 3 is a photomicrograph similar to FIG. 2, only enlarged to a magnification of approximately 860 times its true size to better show the interface between the article and coating.

The effectiveness of the fusible bonding method and apparatus of the present invention is shown by the photomicrograph of FIG. 2. This clearly indicates the relatively thin, but high quality interstitial bond between the hard metallic alloy surface 56 and the metallic base material of the engine valve 14. The upper portion of the photomicrograph shows the relatively fine microstructure of the Stellite No. 6 surface, while the lower portion thereof shows the uniform distribution of fine carbides in an austenitic matrix which is associated with the austenitic chrome nickel silicon steel of the engine valve. Between these two regions is a relatively thin overall diffusion zone or region of interstitial bond which clearly illustrates the relatively complete fusion thereof, the absence of cracks or voids, and the absence of oxide inclusions or the like which would deleteriously affect the structure. Such thin region of interstitial bond is pictorially noted to be approximately 0.003" (0.075 mm) thick, and with the dark line resulting from the etchant used representative of a substantially planar interface. As is more clearly shown in the more greatly enlarged photomicrograph of FIG. 3, this planar interface is noted to be only about 0.0005" (0.012 mm) thick and yet the uniformity thereof is indicative of a high strength bond.

Figure 4:
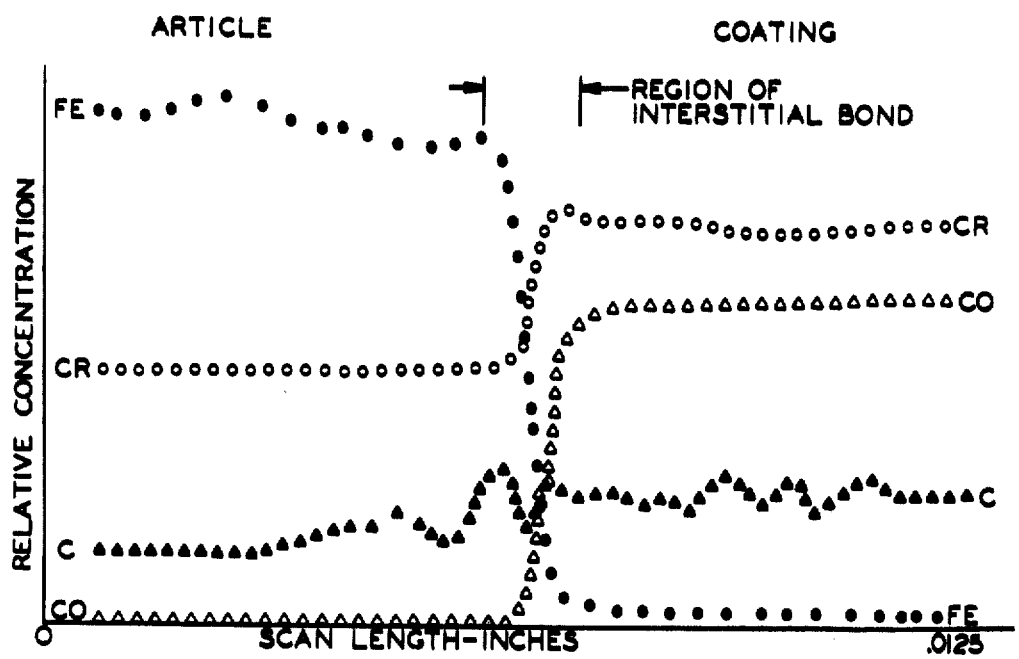
FIG. 4 is an electron microprobe line scan across an article and associated hardened coating produced by the method and apparatus of the present invention, and particularly an engine valve having an austenitic chrome nickel silicon steel base material and a Stellite No. 6 coating at the valve seat thereof.
Figure 5:
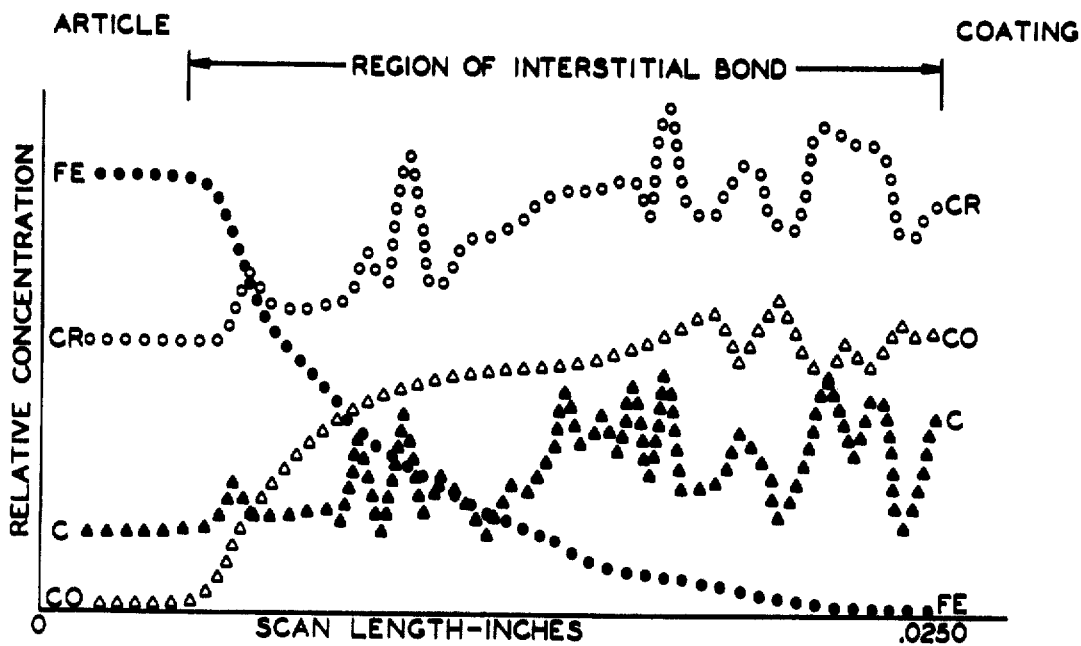
FIG. 5 is an electron microprobe line scan of a conventional engine valve produced by puddle welding and having an austenitic chrome nickel silicon steel base material and a Stellite No. 6 coating at the valve seat thereof for purposes of comparison with FIG. 4, and at twice the scan length thereof.

As best shown in FIG. 4, an electron microprobe line scan of the engine valve 14 of the present invention indicates an extremely uniform metallurgical composition of the ferrous base material and metallic coating, which are respectively disposed to the left and right when viewing the graph. The relative qualitative, not quantitative, concentration values of the elements iron (Fe), chromium (Cr), carbon (C), and cobalt (Co) are shown, while for illustrative convenience the concentration values of the primary remaining elements nickel, silicon and tungsten have been omitted from the graph. It is apparent that the smoothness of the scan lines confirms the fine grain structure of the coating, as well as the thin region of interstitial bond comparable to that shown in the photomicrograph of FIG. 2. On the other hand, upon inspection of FIG. 5 showing a line scan of a conventional puddle-welded engine valve, it is clear that the thickness of the region of interstitial bond is approximately 0.020" (0.5 mm), which is approximately ten times the 0.002" (0.05 mm) thickness of the corresponding region in FIG. 4. Note is also made in FIG. 5 of the very significant extent of the dissolution of the iron (Fe) present in the base material into the coating of the prior art engine valve, which can deleteriously embrittle and reduce the oxidation resistance thereof. Such dissolution is advantageously negligible in the engine valve of the present invention as shown in the relatively abrupt descendency of the iron line in FIG. 4. Also, the coinciding peaks and valleys in the chrome (Cr), cobalt (Co) and carbon (C) scan lines of the prior art coating in FIG. 5 are indicative of the formation of large crystals, such as chromium carbides, which accompanies the high heat input and slow cooling operation of puddle welding. Note that such peaks are substantially absent in the line scan of the coating of FIG. 4, indicating its fine grain structure.

As best shown in the photomicrograph of FIG. 6, the prior art coating exhibits relatively large dendritic formations with carbides in a cobalt matrix, and this is dramatically distinct from the much finger coating structure of the present invention as shown in FIG. 2. This metallurgical difference is reflected in Rockwell hardness readings of $R_c$ 65-67 in the Stellite coating of the present invention, as compared to the usual $R_c$ 62-65 Stellite coating readings of prior art. Such increased hardness results in an engine value having increased resistance to wear.

Thus, the fusible bonding method and apparatus of the present invention has proven extremely effective in hard facing an engine value using continuous wave laser energy as a heat source. An examination of the microstructure of the hard alloy surface and the metal article has indicated excellent fusion therebetween and a relatively narrow but high strength interstitial bond. Further, the relatively high power laser beam has been found to be closely controllable to minimize the transmission of heat into the remainder of the article, and accordingly quicker cooling thereof. On the other hand, it can easily be focused or collimated to provide uniform heat distribution over a relatively wide path. For example, laser beam widths of greater than ⅛ inch (3.175 mm) are easily achieved, whereas electron beam widths are normally restricted to less than 1/16 inch (1.59 mm). Greater surface areas can therefore be hard surfaced utilizing the method of the present invention.

It should also be appreciated that the method and apparatus of the present invention may be easily adapted to make a composite metal article by applying a relatively solid coating material with a preformed shape to the base material. For example, rather than depositing only the relatively clean and pure powder 12 on the engine valve 14 as in the instant case, such powder can be mixed with a suitable binder and formed into an annular ring. The ring can then be placed on the valve and subjected to the heating energy of the laser beam 50 substantially as described above without departing from the spirit of the present invention. It is apparent that various relatively thick coatings of material dissimilar to the base material, in the order of 0.050" (1.27 mm) thickness, can be quickly applied in a single pass utilizing these principles. This obviates the need to make multiple passes which can excessively heat the article.

While the invention has been described and shown with particular reference to a preferred embodiment, it will be apparent that other variations might be possible that would fall within the scope of the present invention, which is not intended to be limited except as defined in the following claims.

What is claimed is:

1. An apparatus for fusibly bonding a substantially solid powder coating material to a metal article, comprising:
   a frame;
   holding means for supporting the article and for moving the article at a preselected rate relative to the frame;
   depositing means for metering and depositing the substantially solid powder coating material onto a surface of the article in the form of a levelled band of powder in response to movement of the article by the holding means; and
   laser beam means for liquifying a portion of the band of powder and thereafter liquifying the juxtaposed surface of the article, controlling the heat transmission into said article, thereafter rapidly hardening a trailing part of the liquified portion of the band of powder while progressively moving the band of powder past the laser beam means, and generating a surface layer having properties based substantially solely on the coating material and a relatively thin, strong region of interstitial bond between the surface layer and the article.

2. The apparatus of claim 1 wherein the article has an annular portion thereon adapted to receive the band of powder from the depositing means, and said holding means includes a rotatable member supporting the article at an orientation sufficient for the annular portion and the band of powder to pass arcuately through said laser beam means and provide a ring of hardened material on the article.

3. An apparatus for fusibly bonding a powder to a metal article, comprising:
   a frame;
   a powder delivery tube of a construction and placement relative to the article sufficient for controllably placing the powder onto a surface of the metal article in the form of a band of powder of relatively uniform preselected cross section, said powder delivery tube being connected to the frame in an upright relationship;
   laser beam means for controllably melting the band of powder at a heat interaction zone and the juxtaposed surface of the article; and
   holding means for relatively moving the article relative to the frame and the laser beam means at a rate sufficient to provide a traveling melt along the band of powder and cooling and hardening of a trailing portion of the melt.

4. The apparatus of claim 3 wherein said powder delivering tube is located at a preselected distance from the surface of the article sufficient for metering and self-leveling the powder.

5. The apparatus of claim 4 wherein the article is an engine valve, and the holding means includes a support member and means for rotating the support member and the engine valve together relative to the laser beam means and the powder delivery tube.

6. The apparatus of claim 5 wherein the support member is mounted on the frame at about a 45° angle relative to a horizontal plane and the heat interaction zone is located substantially at the apogee of the engine valve in its mounted position on the support member.

7. The apparatus of claim 6 wherein the powder delivery tube has a conically tapered lower end located adjacent the apogee of the engine valve.

* * * * *